United States Patent
Kajiwara et al.

(10) Patent No.: US 11,532,064 B2
(45) Date of Patent: Dec. 20, 2022

(54) DESTINATION PROPOSAL SYSTEM, PROPOSAL DEVICE, AND PROPOSAL METHOD

(71) Applicants: Nissan Motor Co., Ltd., Kanagawa (JP); RENAULT S.A.S., Boulogne-Billancourt (FR)

(72) Inventors: Shingo Kajiwara, Kanagawa (JP); Takehiro Miyoshi, Kanagawa (JP); Seigo Watanabe, Kanagawa (JP); Kazumasa Fujita, Kanagawa (JP); Hiroya Fujimoto, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 297 days.

(21) Appl. No.: 16/957,900

(22) PCT Filed: Dec. 5, 2018

(86) PCT No.: PCT/IB2018/001479
§ 371 (c)(1),
(2) Date: Jun. 25, 2020

(87) PCT Pub. No.: WO2019/130057
PCT Pub. Date: Jul. 4, 2019

(65) Prior Publication Data
US 2020/0334783 A1    Oct. 22, 2020

(30) Foreign Application Priority Data
Dec. 27, 2017  (JP) .............................. JP2017-252037

(51) Int. Cl.
*G06Q 50/30* (2012.01)
*G06F 16/29* (2019.01)
(Continued)

(52) U.S. Cl.
CPC ......... *G06Q 50/30* (2013.01); *G01C 21/3438* (2013.01); *G06F 16/29* (2019.01);
(Continued)

(58) Field of Classification Search
CPC .. G06Q 50/30; G06Q 10/025; G06Q 30/0282; G06Q 10/047; G01C 21/3438;
(Continued)

(56) References Cited

U.S. PATENT DOCUMENTS 8,700,539 B2 * 4/2014 Strohmenger ......... G06Q 10/06
705/319
2008/0165032 A1  7/2008 Lee et al.
(Continued)

FOREIGN PATENT DOCUMENTS

JP           2014-238831 A      12/2014

OTHER PUBLICATIONS

International Search Report issued in Application No. PCT/IB2018/001479, dated Apr. 16, 2019 (3 pages).
(Continued)

*Primary Examiner* — Julio R Perez
(74) *Attorney, Agent, or Firm* — Osha Bergman Watanabe & Burton LLP (57) ABSTRACT

The present disclosure includes receiving, by a server (1), experience information via a telecommunications network (3) from each of terminals (3) carried by respective users (A to E), the experience information being information regarding an experience desired by each of the users; extracting, in the server, two or more users to generate a single community for the experience information of the two or more users, the two or more users transmitting the experience information having a similarity level not less than a predetermined threshold; extracting, in the server, a destination (5) associated with the experience information having the similarity level not lower than the predetermined threshold using a database (17) configured to preliminarily store the experience information and the destination in association with each other; and transmitting the destination from the server
(Continued)

via the telecommunications network to the terminals carried by the two or more users who constitute the single community.

11 Claims, 7 Drawing Sheets

(51) Int. Cl.
    *G01C 21/34*     (2006.01)
    *G06Q 10/02*     (2012.01)
    *G06Q 30/02*     (2012.01)
    *H04W 4/021*     (2018.01)
    *H04W 4/02*     (2018.01)

(52) U.S. Cl.
    CPC ....... *G06Q 10/025* (2013.01); *G06Q 30/0282* (2013.01); *H04W 4/022* (2013.01); *H04W 4/023* (2013.01)

(58) Field of Classification Search
    CPC ...... G06F 16/29; G06F 16/907; H04W 4/022; H04W 4/023
    See application file for complete search history.

(56) References Cited

U.S. PATENT DOCUMENTS

| | | |
|---|---|---|
| 2010/0280884 A1 | 11/2010 | Levine et al. |
| 2014/0365250 A1 | 12/2014 | Ikeda et al. |
| 2016/0048777 A1 | 2/2016 | Kitagawa et al. |
| 2018/0219809 A1* | 8/2018 | Matsuzaki ......... G06Q 30/0241 |

OTHER PUBLICATIONS

Extended European Search Report issued in counterpart European Patent Application No. 18897061.0, dated Nov. 17, 2020 (10 pages).

* cited by examiner

| User | | | | | Desired experience (input items) | | | | | | | Matching level |
|---|---|---|---|---|---|---|---|---|---|---|---|---|
| Name | Gender | Generation | Current location | Hometown, hobby, etc. | Genre | Abstract content (plain dish, local dish) | Range of destination | Boarding location (current location) | Deboarding location | Desired time slot | Return time | Budget (including transport service) | |
| A | F | 20s | 35, 139 | US | Meal | Want to eat X | Within Kanagawa | | | 15:00~16:00 | ~19:00 | ~3,000 yen | ◎ |
| B | F | 20s | 33, 139 | US | Meal | Want to eat X' | Within Kanagawa | | | Afternoon | ~19:00 | ~3,000 yen | ○ |
| C | M | 20s | 34, 140 | CN | Sightseeing | Want to see Y | Within Tokyo | | | Night | ~24:00 | ~4,000 yen | |
| D | F | 20s | 35, 141 | CA | Meal | Want to eat X | Within Kanagawa | | | Afternoon | ~20:00 | ~3,000 yen | ◎ |
| E | M | 30s | 35, 139 | CN | Meal | Want to eat Z | Within Tokyo | | | Night | ~23:00 | | |

FIG. 4

| No. | Name of restaurant | Location | Rough moving time (time from user's location to destination) | Available reservation time | Gourmet website evaluation | Total score of community | Score of each user |
|---|---|---|---|---|---|---|---|
| 1 | Restaurant L | Yokohama city, Kanagawa | | 15:00-17:00 | 4.5 | 90 | |
| 2 | Restaurant M | Yokohama city, Kanagawa | | 17:00-19:00 | 3.0 | 75 | |
| 3 | Restaurant N | Machida city, Tokyo | | 15:00-16:00 | 4.2 | 70 | |
| 4 | ... | ... | | ... | ... | | |

FIG. 5

| Name of restaurant | Location | Rough moving time (time from user's location to destination) | Available reservation time | Gourmet website evaluation | Budget range | Return time | Attribute of community (number of guests, gender, generation) |
|---|---|---|---|---|---|---|---|
| Restaurant | Yokohama city, Kanagawa | | 15:00-17:00 | 4.5 | ¥3000 ~ ¥4000 | 18:00 | Three, Females, Visitors |

FIG. 6

Allocated vehicle: Passenger automobile (four-seater)

| Schedule ID | S1 | | | | |
|---|---|---|---|---|---|
| Stop place | Vehicle allocation center | Point P1 | Point P2 | Point P3 | Restaurant L |
| Arrival time | - | 14:14 | 14:29 | 14:44 | 15:00 |
| Departure time | 14:00 | 14:15 | 14:30 | 14:45 | - |
| Boarding user | | A | B | D | |

FIG. 7

DESTINATION PROPOSAL SYSTEM, PROPOSAL DEVICE, AND PROPOSAL METHOD

TECHNICAL FIELD

The present invention relates to a system, device, and method for proposing a destination.

BACKGROUND ART

A transport service reservation method is known (Patent Document 1: JP2014-238831A). In this method, first, a boarding request including the designation of a departure place and a destination is received. For each vehicle capable of providing a boarding vehicle in a plurality of kinds of boarding forms with the same vehicle, an achievable boarding vehicle about a plurality of kinds of boarding forms is prepared with reference to information showing a schedule assigned to the vehicle and the kinds of boarding forms of the schedule. A selection probability of each boarding vehicle constituting a subset is calculated for each subset satisfying a prescribed condition among subsets of prepared achievable boarding vehicle group. On the basis of the calculated selection probability, a subset to be presented to the boarding request is selected from among subsets satisfying the prescribed condition.

PRIOR ART DOCUMENT

Patent Document

[Patent Document 1] JP2014-238831A

SUMMARY OF THE INVENTION

Problems to be Solved by Invention

The above conventional transport service reservation method is, however, based on the assumption that the user's destination has already been determined, and is therefore unsuitable for users who want to go somewhere vaguely and have a specific experience.

A problem to be solved by the present invention is to provide a system, device, and method for proposing a destination that are able to render a useful service to users who want to go somewhere and have a specific experience.

Means for Solving Problems

The present invention solves the above problem through receiving experience information from each of terminals carried by respective users, the experience information being information regarding an experience desired by each of the users; extracting two or more users to generate a single community for the experience information of the two or more users, the two or more users transmitting the experience information having a similarity level not less than a predetermined threshold; extracting a destination associated with the experience information having the similarity level not lower than the predetermined threshold using a database configured to preliminarily store the experience information and the destination in association with each other; and transmitting the destination to the terminals carried by the two or more users who constitute the single community.

Effect of Invention

According to the present invention, a cluster of users having desired experiences with a high similarity level is extracted to generate a single community, and a destination associated with the experiences is extracted. The destination is proposed to the users who constitute the community, and a useful service can therefore be rendered to users having a vague need to go somewhere and have a specific experience.

MODE(S) FOR CARRYING OUT THE INVENTION

Figure 1:
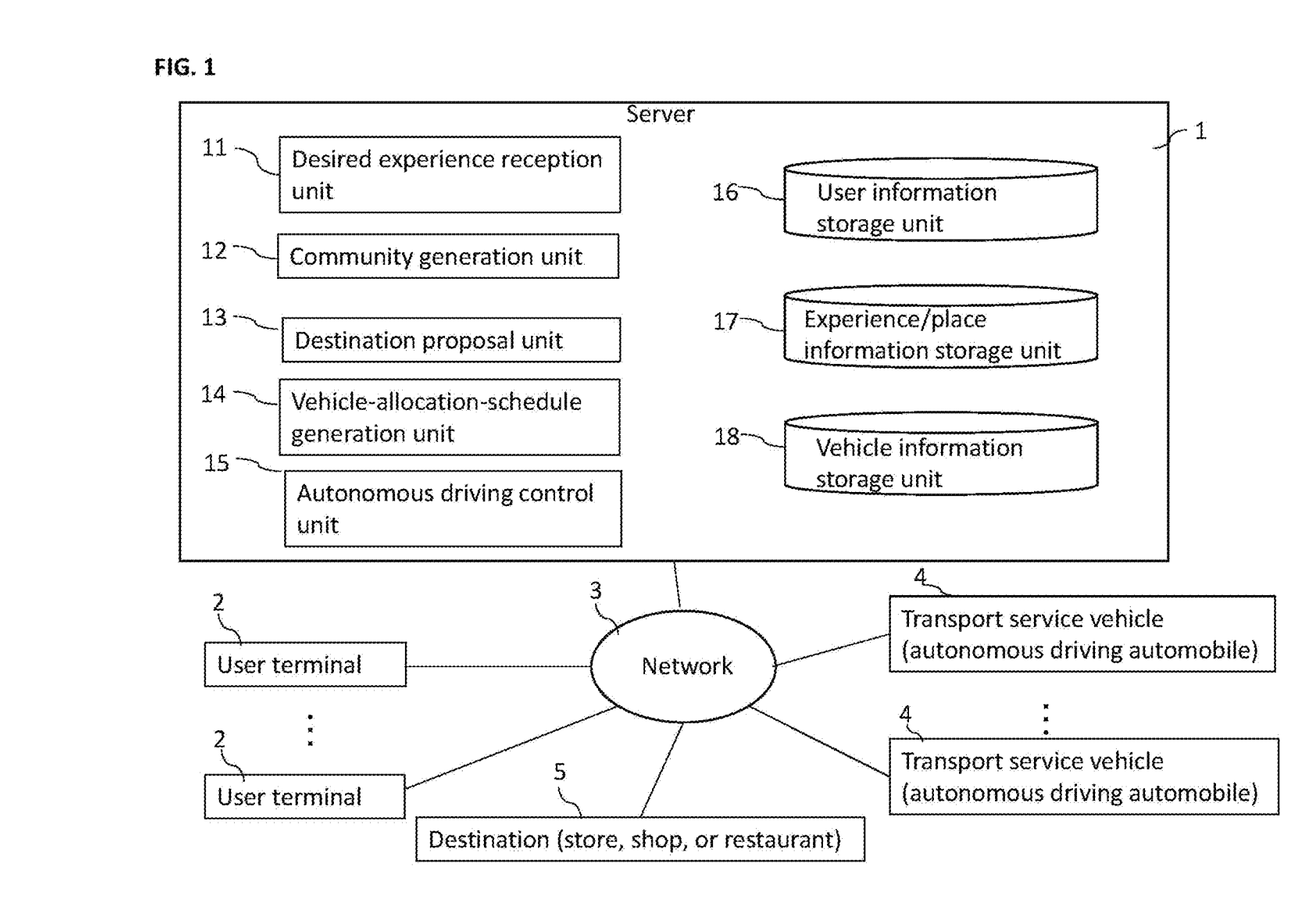
FIG. 1 is a block diagram illustrating one or more embodiments of a system for proposing a destination according to the present invention.

Hereinafter, one or more embodiments of a system for proposing a destination according to the present invention will be described with reference to the drawings. FIG. 1 is a block diagram illustrating a system for proposing a destination according to one or more embodiments of the present invention. The system according to one or more embodiments of the present invention includes a server 1, a plurality of terminals 2 carried by users, a network 3 that constitutes a telecommunications network, and one or more transport service vehicles 4. The system according to one or more embodiments of the present invention operates as follows. A user who has not determined a specific destination but has a vague desired experience transmits information regarding the desired experience to the server 1, which thereby operates to extract other users who desire a similar experience. After grouping these users into a single community, the server 1 operates to extract a destination that most matches the desired experience from a database and propose the destination to the users who constitute the community. Then, the service is rendered to allocate a transport service vehicle and transport the users who accepted the proposal to the destination while passing through the locations of the users and picking them up.

Although not particularly limited, an example of the operation will be described to facilitate the understanding of the present invention. When a traveler A who visits an unfamiliar place has several hours until the next schedule and wants to eat local delicacy, especially "Okonomiyaki"

(one of popular Japanese foods), he/she may usually conceive of a conventional way to search for a recommended Okonomiyaki restaurant on a gourmet website using a terminal such as a smartphone and move to the restaurant using a taxi or the like (the term "restaurant" as used herein encompasses the concept of a shop or store and other appropriate facilities). According to this conventional restaurant search on a gourmet website, however, the place and name of the restaurant are displayed, but the traveler has to go to the restaurant by himself/herself, in which case the taxi fare may not be cheap, and even when using an inexpensive bus, the traveler may not know how to get to the restaurant because of the unfamiliar place. Moreover, this conventional way is very inconvenient because the traveler cannot know how long it takes time to get to the restaurant and return to the current location without using another search site such as a navigation site. In this context, the system according to one or more embodiments of the present invention operates to group the users who similarly want to eat Okonomiyaki, extract a recommended Okonomiyaki restaurant that is preliminarily stored, allocate a transport service vehicle to pick up the plurality of users at their current locations, and transport the users to the desired Okonomiyaki restaurant.

The "desired experience" according to one or more embodiments of the present invention means a matter which the user himself/herself wants to experience, and in the above-described example, refers to an experience of "wanting to have a meal," especially "wanting to eat Okonomiyaki." Examples of the "desired experience" include not only this kind of experience of wanting to have a meal but also other genres of experiences, such as experiences of wanting to go to sightseeing spots, to go shopping, to watch movies, to watch sports, and to go to hospitals. In the system according to one or more embodiments of the present invention, such various kinds of experiences are included.

The server 1 according to one or more embodiments of the present invention is configured by a computer installed with hardware and software. Specifically, the server 1 is configured to include a read only memory (ROM) that stores programs, a central processing unit (CPU) that executes the programs stored in the ROM, and a random access memory (RAM) that serves as an accessible storage device. A micro processing unit (MPU), a digital signal processor (DSP), an application specific integrated circuit (ASIC), a field programmable gate array (FPGA), or the like can be used as an operation circuit as substitute for or in addition to the CPU. As illustrated in FIG. 1, the software established in the ROM achieves each of the functions, which will be described later, of a desired experience reception unit 11, a community generation unit 12, a destination proposal unit 13, a vehicle-allocation-schedule generation unit 14, and an autonomous driving control unit 15. In addition, storage units are provided, including a user information storage unit 16, an experience/place information storage unit 17, and a vehicle information storage unit 18. Using the information stored in the storage units, the software established in the ROM achieves each of the functions, which will be described later, of the desired experience reception unit 11, the community generation unit 12, the destination proposal unit 13, the vehicle-allocation-schedule generation unit 14, and the autonomous driving control unit 15.

The system according to one or more embodiments of the present invention will be described on the assumption that a number of persons who can be the users own the terminals 2 which are carried or used on a daily basis. Examples of this type of terminals 2 for use include smartphones, mobile phones, and portable computers. Each terminal 2 according to one or more embodiments of the present invention has a computer function, specifically, an input unit for inputting data, which will be described later, a communication function for transmitting the input data to the desired experience reception unit 11 of the server 1, and a location detection function of a GPS receiver or the like that detects the current location of the terminal 2. Each terminal 2 transmits its own ID, current location, and input data to the desired experience reception unit 11 of the server 1 via a network 3 (wireless communication network) including the Internet. Specific examples of various information items input to the terminals 2 according to one or more embodiments of the present invention will be described later.

Each of the transport service vehicles 4 can be any of a commonly-used automobile equipped with a navigation device and driven by a human, an automobile that is equipped with a navigation device and has a function of controlling the travel control (speed control and steering control) in an autonomous manner but is driven by a human, and an unmanned automobile that is equipped with a navigation device and controls the travel control (speed control and steering control) in a fully autonomous manner. The following one or more embodiments of the present invention will be described by exemplifying unmanned autonomous driving automobiles as those permitted by the road traffic regulations. When locational information (e.g., latitude/longitude) of way points and a destination 5 and node information regarding a travel route are input from the current location, each of the unmanned autonomous driving automobiles operates to execute the speed control and steering control, such as control of start, speed, stop, and right or left turn, in an autonomous manner while detecting the travel environment by means of a camera or the like, thereby picking up the users at the way points and transporting them to the destination 5. It is assumed that a number of such transport service vehicles 4 are prepared and wait at two or more prepared standby stations or wait for a travel command from the server 1 while traveling around a predetermined travel route.

Figure 3:
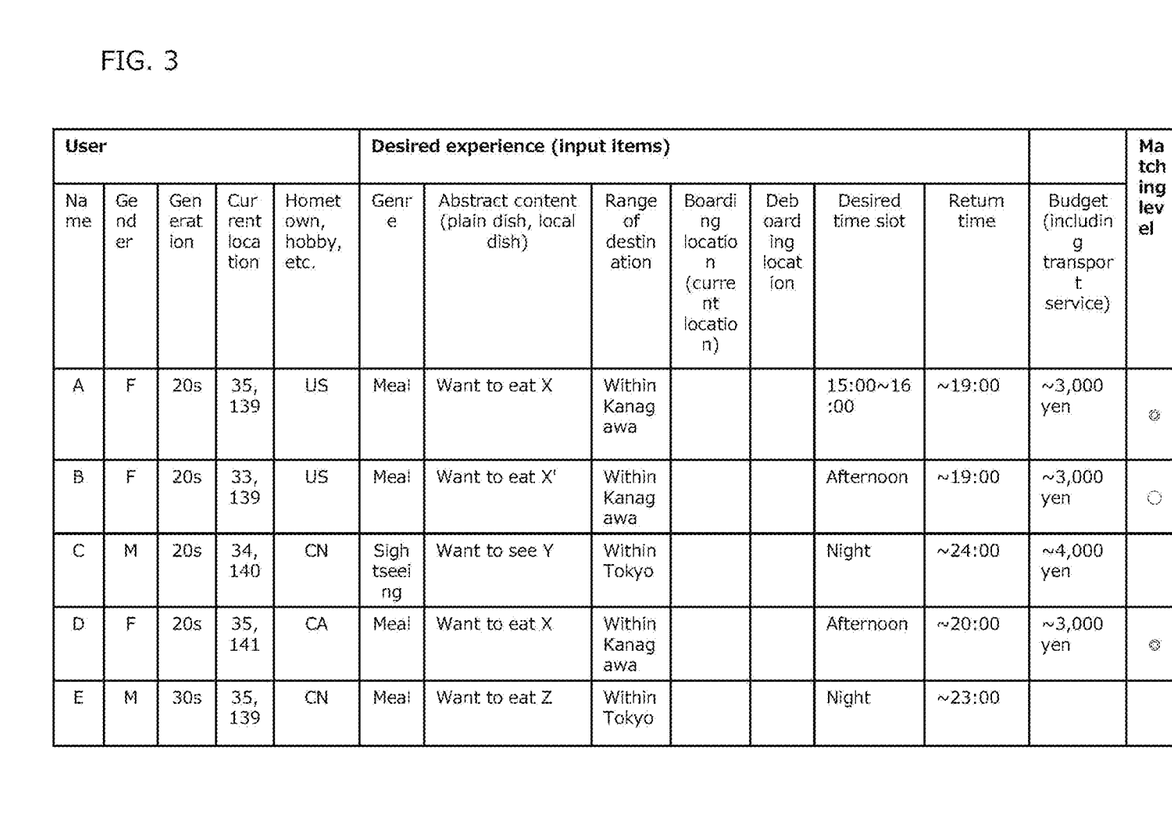
FIG. 3 is a diagram illustrating an example of a desired experience list generated by a community generation unit of FIG. 1.

The configuration of the server 1 will then be described. The desired experience reception unit 11 receives the information, which is transmitted from the terminal 2 carried by each of a plurality of users, via the network 3 at a predetermined time interval (e.g., 100 msec). FIG. 3 is a diagram illustrating an example of the desired experience list generated by the community generation unit 12 of the server 1. As illustrated in FIG. 3, the information transmitted from a terminal 2 includes, in addition to the ID of the user who owns the terminal 2, a genre and abstract desired experience information that is a sub-category of the genre, the range of a destination, the boarding location, the deboarding location, the desired time slot for a desired experience, the return time to the deboarding location, the desired budget, etc. as information regarding the desired experience.

The user ID includes, for example, name, address, gender, generation (or age), hometown, hobby, etc. Each user accesses the system according to one or more embodiments of the present invention to preliminarily register these information items before using the system. The system according to one or more embodiments of the present invention operates to store the registered information of each user in the user information storage unit 16 of the server 1. When a user registered in the system according to one or more embodiments of the present invention uses the system, the user launches an execution program (such as application software) for the system installed in the terminal 2 and inputs a preliminarily assigned ID to connect to the server 1.

The user information storage unit 16 of the server 1 stores the preliminarily registered attribute information, such as the name, address, gender, generation (or age), hometown, and hobby, in a form of being associated with the ID of each user. When a specific user accesses the server 1 using his/her ID, the server 1 can operate to recognize the attribute information stored in the user information storage unit 16.

Although illustration is omitted, when a user accesses the server 1 using the terminal 2, the terminal 2 carried by the user displays a screen with which the user can input, as the above-described information regarding a desired experience, a genre and abstract desired experience information that is a sub-category of the genre, the range of a destination, the boarding location, the deboarding location, the desired time slot for the desired experience, the return time to the deboarding location, the desired budget, etc., and the user inputs the information regarding the desired experience for each item. Information on the current location of the terminal 2 transmitted to the desired experience reception unit 11 is detected as the latitude and longitude by a location detection sensor such as a GPS receiver provided in the terminal 2, and this locational information is transmitted to the desired experience reception unit 11 together with the information regarding the desired experience.

In the system according to one or more embodiments of the present invention, a genre and abstract desired experience information that is a sub-category of the genre, the range of a destination, the boarding location, the deboarding location, the desired time slot for the desired experience, the return time to the deboarding location, the desired budget, etc. have been exemplified as the information transmitted to the desired experience reception unit 11, but it is sufficient to transmit at least a genre and abstract desired experience information that is a sub-category of the genre, and other information such as the range of a destination, the boarding location, the deboarding location, the desired time slot for the desired experience, the return time to the deboarding location, and the desired budget may be transmitted as necessary. The user may manually input the desired experience information on the input screen displayed on the terminal 2, but another input method may also be employed, in which those frequently input are prepared in a pull-down menu for selection of one of them. Additionally or alternatively, for items that are not particularly concerned among these input information items, an item of "no desire" may be prepared or these items may be transmitted to the server 1 with blanks, thereby to allow for recognition that there is no special desire.

The example illustrated in FIG. 3 is made on the assumption that a user A (female, 20s, from the United States) is located at a latitude of 35° north and a longitude of 139° east, selects the genre of "meal," especially "wanting to eat X," and selects the range of a destination: "within Kanagawa," the desired time slot: "15:00 to 16:00," the return time: "until 19:00," and the desired budget: "up to 3,000 yen." Here, "X" is a specific food of the meal, such as the above-described "Okonomiyaki." The boarding location being blank means that she desires to board at the current location, and the deboarding location being blank means that she desires only to be transported to destination 5.

Likewise, it is assumed that a user B (female, 20s, from the United States) is located at a latitude of 33° north and a longitude of 139° east, selects the genre of "meal," especially "wanting to eat X'," and selects the range of a destination: "within Kanagawa," the desired time slot: "afternoon," the return time: "until 19:00," and the desired budget: "up to 3,000 yen," and the boarding location and the deboarding location are blank. Here, "X'" is a food similar to the Okonomiyaki X in the above-described example, such as Monjayaki (another one of popular Japanese foods).

Likewise, it is assumed that a user C (male, 20s, from China) is located at a latitude of 34° north and a longitude of 140° east, selects the genre of "sightseeing," especially "wanting to see Y," and selects the range of a destination: "within Tokyo," the desired time slot: "night," the return time: "until 24:00," and the desired budget: "up to 4,000 yen," and the boarding location and the deboarding location are blank.

Likewise, it is assumed that a user D (female, 20s, from Canada) is located at a latitude of 35° north and a longitude of 141° east, selects the genre of "meal," especially "wanting to eat X," and selects the range of a destination: "within Kanagawa," the desired time slot: "afternoon," the return time: "until 20:00," and the desired budget: "up to 3,000 yen," and the boarding location and the deboarding location are blank.

Likewise, it is assumed that a user E (male, 30s, from Canada) is located at a latitude of 35° north and a longitude of 139° east, selects the genre of "meal," especially "wanting to eat Z," and selects the range of a destination: "within Tokyo," the desired time slot: "night," and the return time: "until 23:00," and the desired budget, the boarding location, and the deboarding location are blank. Here, "Z" is a food that is not similar to the above-described Okonomiyaki X, such as Japanese "Soba" noodle.

The community generation unit 12 of FIG. 1 virtually lists the information regarding the desired experiences from users received by the desired experience reception unit 11 as illustrated in FIG. 3 and extracts the users, who transmitted the experience information having a similarity level not lower than a predetermined threshold, to generate a single community for the experience information of the users. The community generation unit 12 determines the similarity level of the experience information on the basis of the predetermined threshold, which is preliminarily determined in accordance with the genre and an abstract desired experience that is a sub-category of the genre. For example, when the genres themselves are different, such as "meal" and "sightseeing," the similarity level is less than a predetermined value, that is, they are dissimilar. Even when the genres are the same, if the abstract desired experiences, which are sub-categories in the genres, are contents that cannot be experienced at the same place, the similarity level is less than a predetermined value, that is, they are dissimilar. For example, in the example illustrated in FIG. 3, the users A, B, D, and E select the genre "meal" while the user C selects the genre "sightseeing," so the similarity level of the desired experiences is lower than a predetermined threshold, that is, a determination is made that they are dissimilar. The user C is therefore not extracted as a member of the single community.

Even in the users A, B, D, and E who select the same genre "meal," the user E is not extracted as a member of a single community that is constituted by the users A and D who select "wanting to eat X" and the user B who selects "wanting to eat X'" because the user E selects "wanting to eat Z" for which a determination is made that the abstract desired experience that is a sub-category of the genre is dissimilar. This is because a restaurant serving Okonomiyaki and/or Monjayaki is highly unlikely to be the same as a restaurant serving Japanese Soba noodle and these restaurants cannot be proposed as one destination 5. In contrast, the users A and D who select "wanting to eat X" and the user B who selects "wanting to eat X'" are highly likely to be able to eat Okonomiyaki and Monjayaki at an Okonomiyaki restaurant or a Monjayaki restaurant, and one destination 5 can therefore be proposed when the similarity level is not lower than a predetermined threshold even with different abstract desired experiences that are sub-categories of genres. Accordingly, the community generation unit 12 determines that the users A, B, and D are users who transmit the experience information having the similarity level not less than the predetermined threshold and groups the users A, B, and D into a single community.

The similarity level of experience information determined by the community generation unit 12 is preferably set in accordance with whether or not the destination 5 finally proposed by the destination proposal unit 13 is common. As in the above-described example, in the genre of meal, a criterion for determining whether or not the food can be serviced in the same restaurant is preferably set as the predetermined threshold. In the genre of sightseeing spots, the sub-categories include cultural sightseeing spots such as shrines and temples, natural landscapes such as hot springs and mountains, and historical sightseeing spots such as ruins, so the similarity level is preferably set in accordance with whether or not the destination 5 finally proposed by the destination proposal unit 13 is common. Also in the genre of purchase (shopping), the sub-categories include those as to what is mainly desired to be purchased, such as whether it is a bag, a wallet, or clothes, so the similarity level is preferably set in accordance with whether or not the destination 5 finally proposed by the destination proposal unit 13 is common.

The community generation unit 12 determines the similarity level of experience information to generate a single community, but may take into account the information on the current locations of the terminals 2 or the desired boarding locations in addition to the similarity level of experience information. In the example of the users A to E illustrated in FIG. 3, the current location of each terminal 2 (desired boarding location) is within a nearby area of a latitude of 33° to 35° north and a longitude of 139° to 141° east and, therefore, provided that the similarity level of experience information is not lower than a predetermined threshold, even when a single community is generated and a vehicle is allocated, it will not take much time to reach the destination 5. However, when there is a user located at the current location apart from the users A to E by a predetermined threshold or more (or when there is a user who desires to board at that location), such a user may be excluded from the single community. In the system according to one or more embodiments of the present invention, the first purpose is to extract users who desire the same or similar experience and propose a destination 5 to these users, but the second purpose is to allocate a transport service vehicle that travels to the destination 5. Thus, when a transport service vehicle is allocated, if it takes an unduly long time to go to the destination 5 while picking up a user at a distant place, this may be disadvantageous for other users who constitute the community.

The community generation unit 12 determines the similarity level of experience information to generate a single community, but may further take into account the information regarding a range of the destination desired by each user in addition to the similarity level of experience information and the above-described information on the current locations of the terminals 2 or desired boarding locations. In the example illustrated in FIG. 3, the three users A, B, and D desire the range of a destination within Kanagawa while the users C and E desire the range of a destination within Tokyo. Thus, the range of destinations desired by the users A, B, and D and the range of destinations desired by the users C and E are different, and a common destination 5 cannot be proposed. When generating a single community for the users A, B, and D, therefore, another community for the users C and E may be taken into account.

The community generation unit 12 determines the similarity level of experience information to generate a single community, but may further take into account the information regarding a time slot for use desired by each user in addition to the similarity level of experience information and the above-described information on the current locations of the terminals 2 or desired boarding locations. In the example illustrated in FIG. 3, the three users A, B, and D desire 15:00 to 16:00 or afternoon as the time slot for use while the users C and E desire night as the time slot for use. Thus, the time slot for use desired by the users A, B, and D and the time slot for use desired by the users C and E are different, and a common destination 5 cannot be proposed. When generating a single community for the user A, B, and D, therefore, another community for the users C and E may be taken into account.

The community generation unit 12 determines the similarity level of experience information to generate a single community, but may further take into account user attribute information including the gender and age of each user in addition to the similarity level of experience information. In the example illustrated in FIG. 3, the three users A, B, and D are all females in their 20s from English-speaking countries of the United States or Canada while the users C and E are males in their 20s or 30s both from non-English-speaking countries of China. Thus, although not particularly concluded, when the users A, B, and D are grouped even into a single community, they are expected to share a ride relatively well to the destination 5 because the user attributes such as gender, age, and language are common.

The following description will be made on the assumption that, as described above, the users A, B, and D among the users A to E illustrated in FIG. 3 transmit the abstract desired experience, which is a sub-category of the genre, of "wanting to eat Okonomiyaki X" or a similar desired experience of "wanting to eat Monjayaki X'" and the community generation unit 12 groups the users A, B, and D into a single community.

Figure 4:
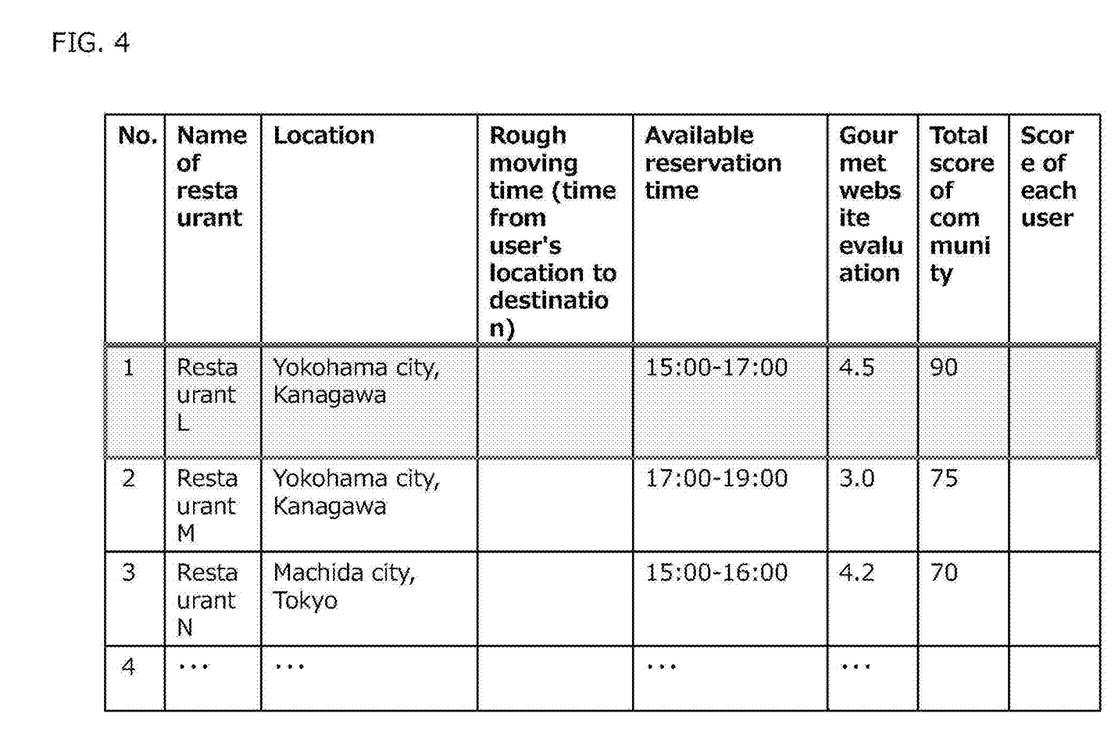
FIG. 4 is a diagram illustrating an example of the result of destination candidate search executed by a destination proposal unit of FIG. 1.
Figure 5:
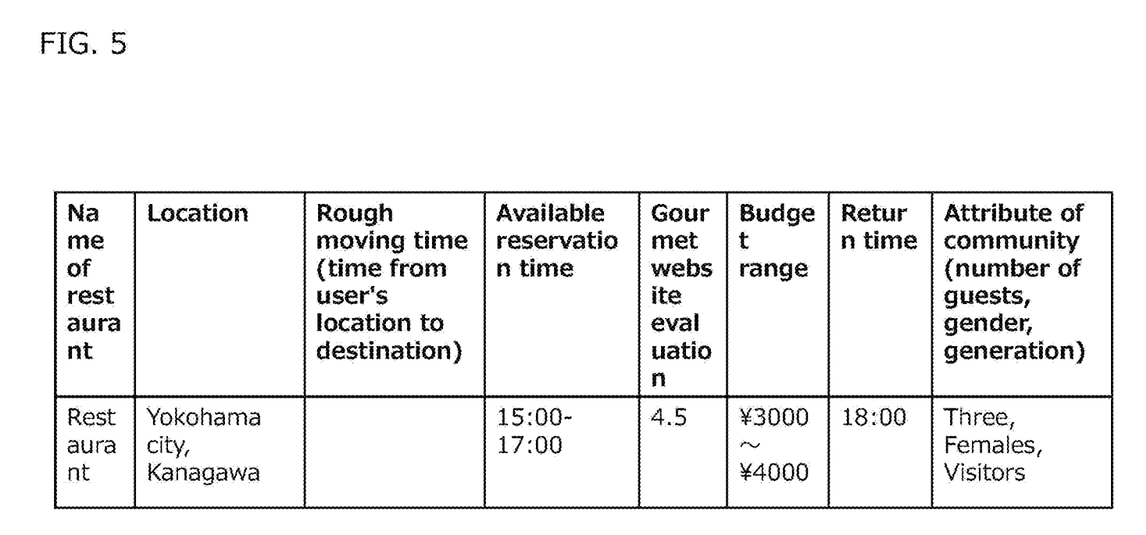
FIG. 5 is a diagram illustrating an example of proposed information transmitted from the destination proposal unit of FIG. 1 to each of terminals carried by users.

The experience/place information storage unit 17 is a database that stores one or more suitable places (destinations 5) in association with the experience information related to the above-described various experiences desired by the users. In the example illustrated in FIG. 3, for the experience information of "wanting to eat Okonomiyaki X" in the genre of meal, the locational information (latitude/longitude) and restaurant name of one or more restaurants that serve Okonomiyaki X are stored in association with the experience information of "wanting to eat X." FIG. 4 is a diagram illustrating an example of the result of destination candidate search executed by the destination proposal unit 13 of the server 1. As illustrated in FIG. 4, for the experience information of "wanting to eat Okonomiyaki X," the experience/place information storage unit 17 stores the locational information (latitude/longitude) and restaurant name of one or more restaurants that serve Okonomiyaki X. For other genres than the genre of meal, the locational information of a place and the place name are stored in the same manner in association with an abstract experience that is a sub-category of a genre. As illustrated in FIG. 4, when evaluation values of other users for the places are listed (columns of "Gourmet website evaluation" illustrated in FIG. 4), this information may also be stored. As illustrated in FIG. 5, when the experience at a place entails some cost, the budget range may also be stored.

The destination proposal unit 13 extracts a destination 5 associated with the experience information having a similarity level not lower than a predetermined threshold using the experience/place information storage unit 17 which stores the experience information and the destination 5 in association with each other. In the example illustrated in FIG. 3, the community generation unit 12 has grouped the users A, B, and D into a single community, and the destination proposal unit 13 therefore extracts, from the experience/place information storage unit 17, the name and locational information of a place (restaurant) associated with the abstract desired experience, which is a sub-category of the genre, of "wanting to eat Okonomiyaki X" and the name and locational information of a place (restaurant) associated with the similar desired experience of "wanting to eat Monjayaki X'." FIG. 4 is a diagram illustrating an example of the result of destination candidate search executed by the destination proposal unit 13 of the server 1, and a plurality of places (restaurants) and their locational information are extracted.

The destination proposal unit 13 transmits the name and locational information (destination 5) of the extracted place to the terminal 2 carried by each of the users A, B, and D who constitute the single community, but may also preliminarily calculate the moving time from each of users A, B, and D to the destination 5 and transmit the moving time together with the above information items. The moving time from each of users A, B, and D to the destination can be calculated from the current location of each of the users A, B, and D and the locational information of the destination 5 using the map information and calculation scheme for a travel route, which are used in the navigation device.

The destination proposal unit 13 transmits the name and locational information (destination 5) of the extracted place to the terminal 2 carried by each of the users A, B, and D who constitute the single community, but may also take into account the range of a destination, the desired time slot, the return time, etc. of the desired experience information illustrated in FIG. 3 other than the abstract desired experience which is a sub-category, and transmit only one or more destinations 5 that match these information items after excluding one or more destinations 5 that do not match these information items. In the example illustrated in FIG. 4, restaurant N is located within Machida city, Tokyo, which does not match the range of a destination within Kanagawa desired by the users A, B, and D, and restaurant M matches the range of a destination, but the available reservation time does not match the desired time slot. Accordingly, restaurant L that satisfies all of the abstract desired experience, which is a sub-category, the range of a destination, the desired time slot, the return time, etc. is proposed as the destination 5. The total score of the community illustrated in FIG. 4 refers to a value that quantitatively indicates an overall matching level of the users A, B, and D who constitute the community and ranges from 0 to 100, and destinations 5 are proposed in descending order of the total score. Scores of the users A, B, and D illustrated in FIG. 4 refer to values that quantitatively indicate respective matching levels of the users A, B, and D, and this information may be transmitted to the terminals 2 carried by the users A, B, and D.

FIG. 5 is a diagram illustrating an example of the proposed information transmitted from the destination proposal unit 13 of the server 1 to each of the terminals 2 carried by the users A, B, and D. As described above, the name, locational information, available reservation time, gourmet site evaluation, and budget range of restaurant L that satisfies all of the desired experiences of the users A, B, and D who constitute the single community, the range of a destination, the desired time slot, the return time, etc., as well as the return time and an overview of the attributes of the users who constitute the community, are transmitted to each of the terminals 2 and displayed thereon. The return time may be calculated as a moving time when each of the users A, B, and D returns from the destination 5 to the current location, in the same manner as when calculating the moving time from each of the users A, B, and D to the destination 5.

The users A, B, and D who have received the proposed information illustrated in FIG. 5 from the destination proposal unit 13 using the terminals 2 may wait for the arrival of the transport service vehicle 4 at the current locations on the assumption that they have accepted the proposed destination 5 (restaurant L). In the system according to one or more embodiments of the present invention, however, the server 1 operates to receive acceptance information that the users A, B, and D accept to go to the proposed destination 5 (restaurant L) or nonacceptance information that they do not accept the proposal, from their terminals 2 via the network 3, and a user of the terminal 2 transmitting the nonacceptance information is excluded from the community. This is because one or more of the users A, B, and D who constitute the community may be satisfied with the desired experiences but may not necessarily be satisfied with other conditions, such as the range of a destination, the desired time slot, and the return time, and the original plan may be changed.

To this end, the vehicle-allocation-schedule generation unit 14 generates a vehicle allocation schedule on the basis of the locational information of the terminal or terminals 2, which have transmitted the acceptance information, among the terminals 2 carried by the users A, B, and D who constitute the community. The vehicle allocation schedule includes the travel route of the transport service vehicle 4, the time of arrival at the location of each of the terminals 2 transmitting the acceptance information, and the time of arrival at the proposed destination 5 (restaurant L). The vehicle-allocation-schedule generation unit 14 preferably generates a minimum-distance or minimum-time travel route of the transport service vehicle 4 using a route search function or the like of a conventional navigation device. This travel route is a route along which the transport service vehicle 4 travels from the current location to the destination 5 (restaurant L) via respective current locations of the terminals 2 carried by the users A, B, and D who constitute the community (it is assumed that all of them have accepted the destination 5). Then, the vehicle-allocation-schedule generation unit 14 transmits the vehicle allocation schedule illustrated in FIG. 6 to the terminal 2 carried by each of the users A, B, and D, and the terminal 2 displays the vehicle allocation schedule.

The autonomous driving control unit 15 acquires the locational information and temporal information included in the vehicle allocation schedule generated by the vehicle-allocation-schedule generation unit 14 and executes, on the transport service vehicle 4, the control for achieving the travel route from the vehicle allocation center to the destination 5 (restaurant L) via current locations P1, P2, and P3 of the users A, B, and D. Alternatively, the vehicle-allocation-schedule generation unit 14 may transmit the locational information and temporal information included in the vehicle allocation schedule generated by the vehicle-allocation-schedule generation unit 14 to the onboard control device of the transport service vehicle 4, and the onboard control device may execute the autonomous driving control. The vehicle information storage unit 18 included in the server 1 is a database that stores information regarding the vehicle state of the transport service vehicle 4, which is transmitted from various sensors included in the transport service vehicle 4, and map data and the like necessary when generating the travel route.

Figure 6:
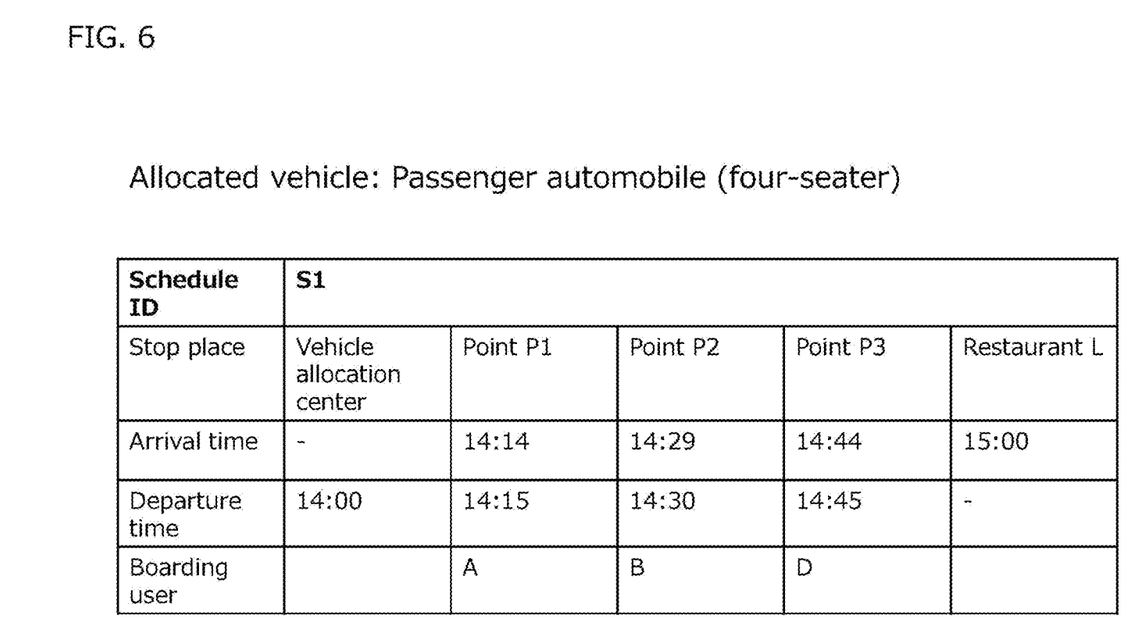
FIG. 6 is a diagram illustrating an example of a vehicle allocation schedule generated by a vehicle-allocation-schedule generation unit of FIG. 1.
Figure 7:
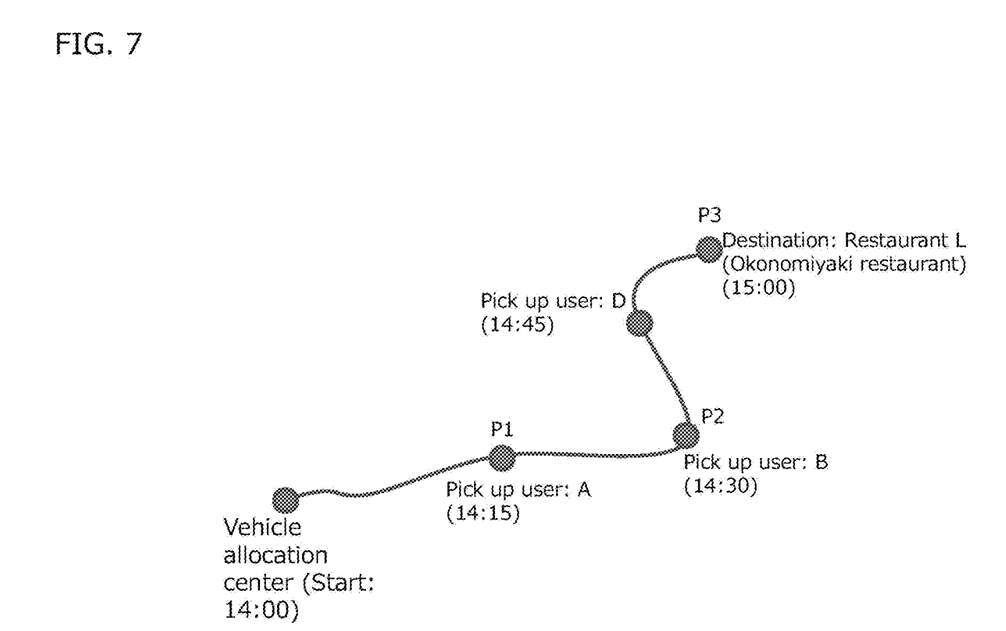
FIG. 7 is a diagram illustrating an example of a travel route based on the vehicle allocation schedule transmitted from an autonomous driving control unit to a transport service vehicle (autonomous (automated) driving automobile).

FIG. 6 is a diagram illustrating an example of the vehicle allocation schedule generated by the vehicle-allocation-schedule generation unit 14, and FIG. 7 is a diagram illustrating an example of the travel route based on the vehicle allocation schedule transmitted from the autonomous driving control unit 15 to the transport service vehicle 4 (autonomous driving automobile). The transport service vehicle 4 departs a vehicle allocation center at 14:00, arrives at a point P1 for the user A to wait at 14:14 and picks up the user A, departs the point P1 at 14:15, arrives at a point P2 for the user B to wait at 14:29 and picks up the user B, departs the point P2 at 14:30, arrives at a point P3 for the user D to wait at 14:44 and picks up the user D, departs the point P3 at 14:45, and arrives at the restaurant L, which is the destination 5, at 15:00.

Figure 2:
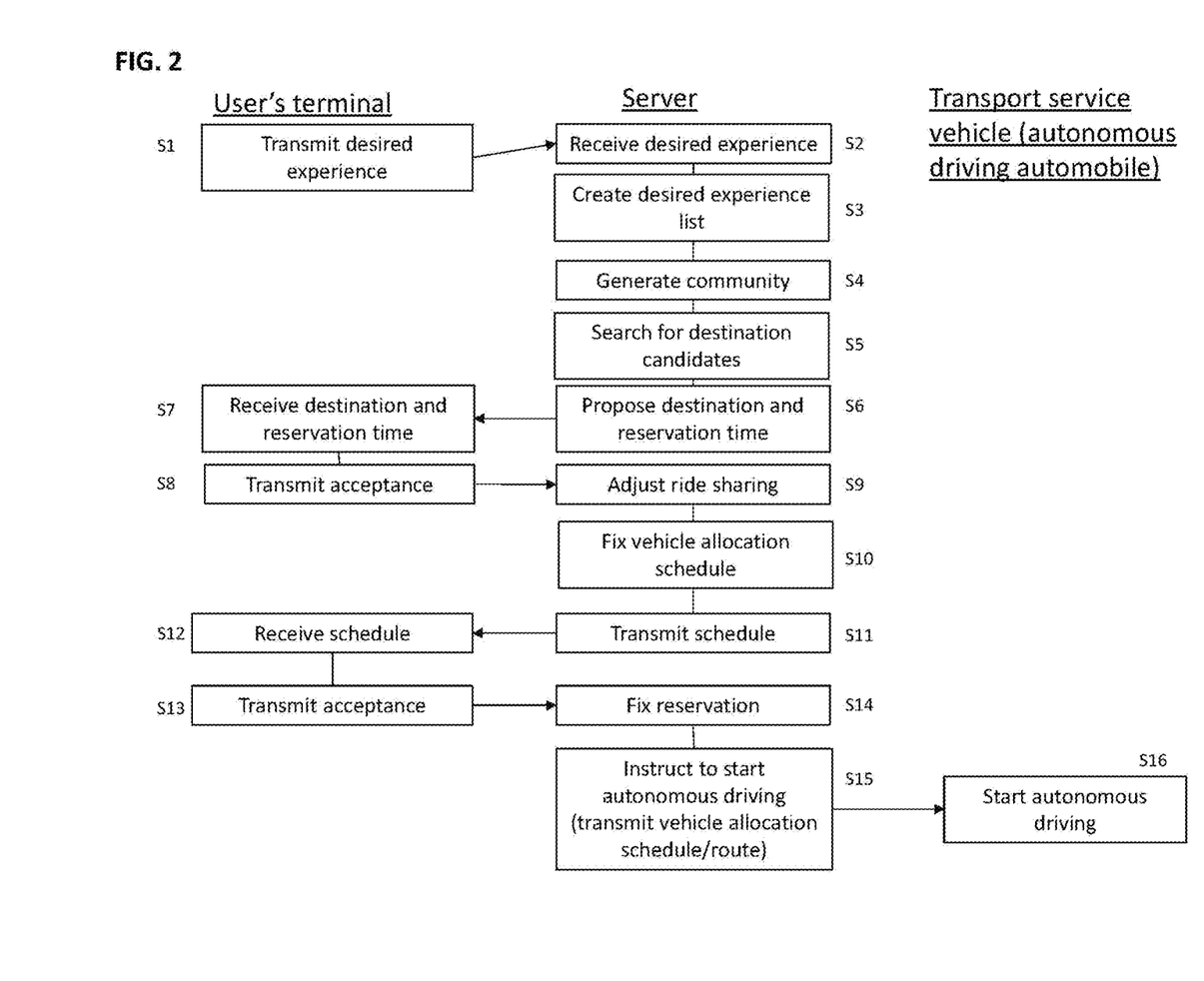
FIG. 2 is a flowchart illustrating an information processing procedure executed in the system for proposing a destination of FIG. 1.

The outline of an information processing procedure executed in the system according to one or more embodiments of the present invention will then be described. FIG. 2 is a flowchart illustrating the information processing procedure.

First, in step S1, when a user accesses the server 1 using the terminal 2, the terminal 2 carried by the user displays a screen with which the user can input, as the above-described information regarding a desired experience, a genre and abstract desired experience information that is a sub-category of the genre, the range of a destination, the boarding location, the deboarding location, the desired time slot for the desired experience, the return time to the deboarding location, the desired budget, etc., and the user inputs the information regarding the desired experience for each item. In addition, the latitude and longitude are detected by a location detection sensor such as a GPS receiver provided in the terminal 2, and this locational information is transmitted to the desired experience reception unit 11 of the server 1 together with the information regarding the desired experience.

In step S2, the desired experience reception unit 11 of the server 1 receives the above information, which is transmitted from the terminal 2 carried by each of a plurality of users, via the network 3 at a predetermined time interval (e.g., 100 msec). As illustrated in FIG. 3, the information transmitted from a terminal 2 includes, in addition to the ID of the user who owns the terminal 2, a genre and abstract desired experience information that is a sub-category of the genre, the range of a destination, the boarding location, the deboarding location, the desired time slot for a desired experience, the return time to the deboarding location, the desired budget, etc. as information regarding the desired experience.

In step S3, the community generation unit 12 of the server 1 virtually lists the information regarding the desired experiences from users received by the desired experience reception unit 11 as illustrated in FIG. 3. Step S3 is followed by step S4, in which the community generation unit 12 extracts the users, who transmitted the experience information having a similarity level not lower than a predetermined threshold, to generate a single community for the experience information of the users. In the system according to one or more embodiments of the present invention, the community generation unit 12 generates a single community by taking into account, in addition to the similarity level of experience information, the information on the current locations of the terminals 2 or the desired boarding locations, the information regarding a range of the destination desired by each user, the information regarding a time slot for use desired by each user, and the user attribute information including the gender and age of each user. Through this operation, for the users A to E illustrated in FIG. 3, the users A, B, and D who transmitted the abstract desired experience, which is a sub-category of the genre, of "wanting to eat Okonomiyaki X" or a similar desired experience of "wanting to eat Monjayaki X'" are grouped into a single community.

In step S5, the destination proposal unit 13 of the server 1 extracts a destination 5 associated with the experience information having a similarity level not lower than a predetermined threshold using the information in which the experience information stored in the experience/place information storage unit 17 is associated with the destination 5. In the example illustrated in FIG. 3, the users A, B, and D have been grouped into a single community, and the destination proposal unit 13 therefore extracts, from the experience/place information storage unit 17, the name and locational information of a place (restaurant) associated with the abstract desired experience, which is a sub-category of the genre, of "wanting to eat Okonomiyaki X" and the name and locational information of a place (restaurant) associated with the similar desired experience of "wanting to eat Monjayaki X'." As a result, a determination is made that the restaurant L illustrated in FIG. 4 is suitable for the destination 5.

In step S6, the destination proposal unit 13 of the server 1 transmits the proposed information illustrated in FIG. 5 to each of the terminals 2 carried by the users A, B, and D. Then, in step S7, each of the terminals 2 displays the name, locational information, available reservation time, gourmet site evaluation, and budget range of restaurant L that satisfies all of the desired experiences of the users A, B, and D who constitute the single community, the range of a destination, the desired time slot, the return time, etc., as well as the return time and an overview of the attributes of the users who constitute the community.

In step S8, each of the users A, B, and D uses the terminal 2 to determine whether or not to accept the proposed destination 5 (restaurant L) and transmit acceptance information upon a determination of acceptance or nonacceptance information upon a determination of nonacceptance to the server 1. The user who owns a terminal 2 that has transmitted the nonacceptance information is excluded from the community, and the process returns to step S1 for that user. The following description will be made on the assumption that all the users A, B, and D who constitute the community have transmitted the acceptance information in step S8.

In step S9, the vehicle-allocation-schedule generation unit 14 of the server 1 adjusts the ride-sharing of the transport service vehicle 4 on the basis of the locational information of each of the terminals 2 carried by the users A, B, and D who constitute the community, that is, as illustrated in FIG. 6, generates the vehicle allocation schedule which includes the travel route of the transport service vehicle 4, the time of arrival at each of the current locations P1, P2, and P3 of the terminals 2 carried by the three users A, B, and D, and the time of arrival at the proposed destination 5 (restaurant L), and fixes the vehicle allocation schedule in step S10.

In step S11, the vehicle-allocation-schedule generation unit 14 of the server 1 transmits the vehicle allocation schedule illustrated in FIG. 6 to the terminal 2 carried by each of the users A, B, and D, and the terminal 2 displays the vehicle allocation schedule in step S12. This allows each of the users A, B, and D to perceive the arrival time of the transport service vehicle 4; therefore, in step S13, each of the users A, B, and D determines whether or not to accept the vehicle allocation schedule and transmits acceptance information upon a determination of acceptance or nonacceptance information upon a determination of nonacceptance to the server 1. The user who owns a terminal 2 that has transmitted the nonacceptance information is excluded from the community, and the process returns to step S1 for that user. The following description will be made on the assumption that all the users A, B, and D who constitute the community have transmitted the acceptance information in step S13. Then, in step S14, the vehicle-allocation-schedule generation unit 14 of the server 1 determines that the reservation of the vehicle allocation schedule has been completed.

In step S15, the autonomous driving control unit 15 acquires the locational information and temporal information included in the vehicle allocation schedule generated by the vehicle-allocation-schedule generation unit 14 and executes, on the transport service vehicle 4, the control for achieving the travel route, as illustrated in FIG. 7, from the vehicle allocation center to the destination 5 (restaurant L) via the current locations P1, P2, and P3 of the users A, B, and D. In step S16, the transport service vehicle 4 starts the autonomous driving to execute the transport service in accordance with the control command from the autonomous driving control unit 15.

In the system for proposing a destination according to one or more embodiments of the present invention, a cluster of users having desired experiences with a high similarity level is extracted to generate a single community, and a destination 5 associated with the experiences is extracted. The destination 5 is proposed to the users who constitute the community, and a useful service can therefore be rendered to users having a vague need to go somewhere and have a specific experience. In particular, only by inputting vague desired experience information, the transport service vehicle 4 transports the users to the destination 5, so bothersome actions are unnecessary, such as searching for a restaurant, searching for the place of the restaurant, and telling a taxi driver the destination. Moreover, two or more users share a ride on one transport service vehicle 4 and it can therefore be expected that the transport cost is reduced.

In the system for proposing a destination according to one or more embodiments of the present invention, when the similarity level of the experience information is determined to generate a single community, information on the current locations of the terminals 2 or the desired boarding locations are taken into account in addition to the similarity level of the experience information; therefore, the community can be constituted by effectively extracting only the users located within a nearby area, and they can arrive at the destination 5 in a short time.

In the system for proposing a destination according to one or more embodiments of the present invention, when the similarity level of the experience information is determined to generate a single community, information regarding the range of a destination desired by each user is taken into account in addition to the similarity level of the experience information and the information on the current locations of the terminals 2 or the desired boarding locations; therefore, the community can be constituted by effectively extracting only the users located within a nearby area and it is easy to narrow down to the destination 5.

In the system for proposing a destination according to one or more embodiments of the present invention, when the similarity level of the experience information is determined to generate a single community, information regarding the time slot for use desired by each user is taken into account in addition to the similarity level of the experience information and the information on the current locations of the terminals 2 or the desired boarding locations, and the community can therefore be constituted by effectively extracting only the users located within a nearby area.

In the system for proposing a destination according to one or more embodiments of the present invention, when the similarity level of the experience information is determined to generate a single community, user attribute information including the gender and age of the users is taken into account in addition to the similarity level of the experience information, and it can therefore be expected that the users share a ride relatively well to the destination 5.

The above destination proposal unit 13 corresponds to the destination extraction unit and destination transmitter according to the present invention and the above experience/place information storage unit 17 corresponds to the database according to the present invention.

DESCRIPTION OF REFERENCE NUMERALS

1 Server
  11 Desired experience reception unit
  12 Community generation unit
  13 Destination proposal unit
  14 Vehicle-allocation-schedule generation unit
  15 Autonomous driving control unit
  16 User information storage unit
  17 Experience/place information storage unit
  18 Vehicle information storage unit
2 Terminal
3 Network
4 Transport service vehicle
5 Destination

The invention claimed is:

1. A system for proposing a destination, comprising: a server; and terminals carried by respective users,
the terminals each comprising an experience information transmitter configured to transmit experience information regarding an experience desired by each of the users who has not determined a specific destination to the server via a telecommunications network,
the server comprising a processor and a destination transmitter,
wherein the processor is configured to:
receive the experience information from each of the terminals carried by the users via the telecommunications network;
extract two or more users to generate a single community for the experience information of the two or more users, the two or more users transmitting the experience information having a similarity level not less than a predetermined threshold; and
extract a destination associated with the experience information having the similarity level not lower than the predetermined threshold using a database configured to preliminarily store the experience information and the destination in association with each other; and
wherein the destination transmitter is configured to transmit the destination via the telecommunications network to the terminals carried by the two or more users who constitute the single community.

2. The system for proposing a destination according to claim 1, wherein the server operates to:
receive, from the terminals carried by the users, locational information of the terminals in addition to the experience information; and
extract the destination from the database on a basis of the similarity level of the experience information and the locational information.

3. The system for proposing a destination according to claim 2, wherein the server operates to:
receive, from the terminals carried by the users, information regarding a range of the destination desired by each of the users in addition to the experience information and the locational information of the terminals; and
extract the destination from the database on a basis of the similarity level of the experience information, the locational information, and the information regarding the range of the destination.

4. The system for proposing a destination according to claim 2, wherein the server operates to:
receive, from the terminals carried by the users, information regarding a time slot for use desired by each of the users in addition to the experience information and the locational information of the terminals; and
extract the destination from the database on a basis of the similarity level of the experience information, the locational information, and the information regarding the time slot for use.

5. The system for proposing a destination according to claim 1, wherein the server operates to:
receive, from the terminals carried by the users, user attribute information including gender and age of the users in addition to the experience information; and
extract the two or more users to generate the single community for the experience information and the attribute information of the two or more users, the two or more users transmitting the experience information having the similarity level not less than the predetermined threshold and the attribute information having a similarity level not less than a predetermined threshold.

6. The system for proposing a destination according to claim 2, wherein the server operates to:
receive acceptance information indicating acceptance of a proposal or nonacceptance information indicating nonacceptance of the proposal via the telecommunications network from the terminals transmitting the destination;
generate a vehicle allocation schedule on a basis of the locational information of the terminals transmitting the acceptance information, the vehicle allocation schedule including a travel route of a transport service vehicle, a time of arrival at a location of each of the terminals transmitting the acceptance information, and a time of arrival at the destination; and
transmit the vehicle allocation schedule to the transport service vehicle and the terminals transmitting the acceptance information.

7. A device for proposing a destination, comprising a processor and a destination transmitter,
wherein processor is configured to:
receive experience information via a telecommunications network from each of terminals carried by respective users, the experience information being information regarding an experience desired by each of the users who has not determined a specific destination;
extract two or more users to generate a single community for the experience information of the two or more users, the two or more users transmitting the experience information having a similarity level not less than a predetermined threshold; and
extract a destination associated with the experience information having the similarity level not lower than the predetermined threshold using a database configured to preliminarily store the experience information and the destination in association with each other; and
wherein the destination transmitter is configured to transmit the destination via the telecommunications network to the terminals carried by the two or more users who constitute the single community.

8. A method for proposing a destination, comprising:
receiving, by a server, experience information via a telecommunications network from each of terminals carried by respective users, the experience information being information regarding an experience desired by each of the users who has not determined a specific destination;
extracting, in the server, two or more users to generate a single community for the experience information of the two or more users, the two or more users transmitting the experience information having a similarity level not less than a predetermined threshold;
extracting, in the server, a destination associated with the experience information having the similarity level not lower than the predetermined threshold using a database configured to preliminarily store the experience information and the destination in association with each other; and
transmitting the destination from the server via the telecommunications network to the terminals carried by the two or more users who constitute the single community.

9. The system for proposing a destination according to claim 1, wherein the desired experience is a matter which the user himself/herself wants to experience, and includes at least a meal, a sightseeing, a shopping, an appreciation of a cinema, a watching sports or a going to hospital.

10. The device for proposing a destination according to claim 7, wherein the desired experience is a matter which the user himself/herself wants to experience, and includes at least a meal, a sightseeing, a shopping, an appreciation of a cinema, a watching sports or a going to hospital.

11. The method for proposing a destination according to claim 8, wherein the desired experience is a matter which the user himself/herself wants to experience, and includes at least a meal, a sightseeing, a shopping, an appreciation of a cinema, a watching sports or a going to hospital.

* * * * *